United States Patent [19]

Bernhardt

[11] Patent Number: 5,171,103
[45] Date of Patent: Dec. 15, 1992

[54] ARRANGEMENT FOR EXPELLING HIGHLY VOLATILE IMPURITIES FROM GROUND WATER

[76] Inventor: Bruno Bernhardt, Burgstrasse 85, D-7410 Reutlingen, Fed. Rep. of Germany

[21] Appl. No.: 768,633
[22] PCT Filed: Mar. 24, 1990
[86] PCT No.: PCT/EP90/00479
§ 371 Date: Oct. 4, 1991
§ 102(e) Date: Oct. 4, 1991
[87] PCT Pub. No.: WO90/11811
PCT Pub. Date: Oct. 18, 1990

[30] Foreign Application Priority Data

Apr. 5, 1989 [DE] Fed. Rep. of Germany ....... 3910990

[51] Int. Cl.$^5$ ................................. B01B 1/00
[52] U.S. Cl. ...................... 405/128; 55/196; 166/267
[58] Field of Search ............ 405/128, 129; 55/196, 55/183; 210/747, 751, 901; 166/246, 267

[56] References Cited

U.S. PATENT DOCUMENTS

| | | | |
|---|---|---|---|
| 4,045,336 | 8/1977 | Isteri | 210/15 |
| 4,632,601 | 12/1986 | Kuwada | 405/128 |
| 4,850,745 | 7/1989 | Hater et al. | 405/128 X |
| 4,943,305 | 7/1990 | Bernhardt | 55/196 X |

FOREIGN PATENT DOCUMENTS

| | | |
|---|---|---|
| 3811962 | 2/1989 | Fed. Rep. of Germany. |
| 1167397 | 11/1958 | France. |
| 782823 | 9/1957 | United Kingdom. |

*Primary Examiner*—Dennis L. Taylor
*Attorney, Agent, or Firm*—Michael J. Striker

[57] ABSTRACT

An arrangement is provided for expelling highly volatile impurities from a ground water and a soil through which the ground water flows under the action of vacuum in a well shaft driven into an area of contaminated ground water and by directing a gas below a water level in the well shaft. The arrangement has a nozzle body below a water level in the well shaft for distributing a supplied gas; a pipe connected to the nozzle body to guide the gas into an air chamber defined by the nozzle body; a pipe member forming a continuation of the pipe for guiding water down and out through the nozzle body; a conveyor screw arranged in the pipe member and connected to a motor via a shaft passing through the pipe, the pipe member being additionally provided with at least one water through-opening in the region between the nozzle body and the conveyor screw; an intermediate floor arranged in the well shaft and being formed by a pot-like insert provided with an opening for displaceably guiding the pipe member, the pipe member extending through the opening in the intermediate floor; and at least one inflatable clamping hose for securing the intermediate floor to the well shaft.

11 Claims, 1 Drawing Sheet

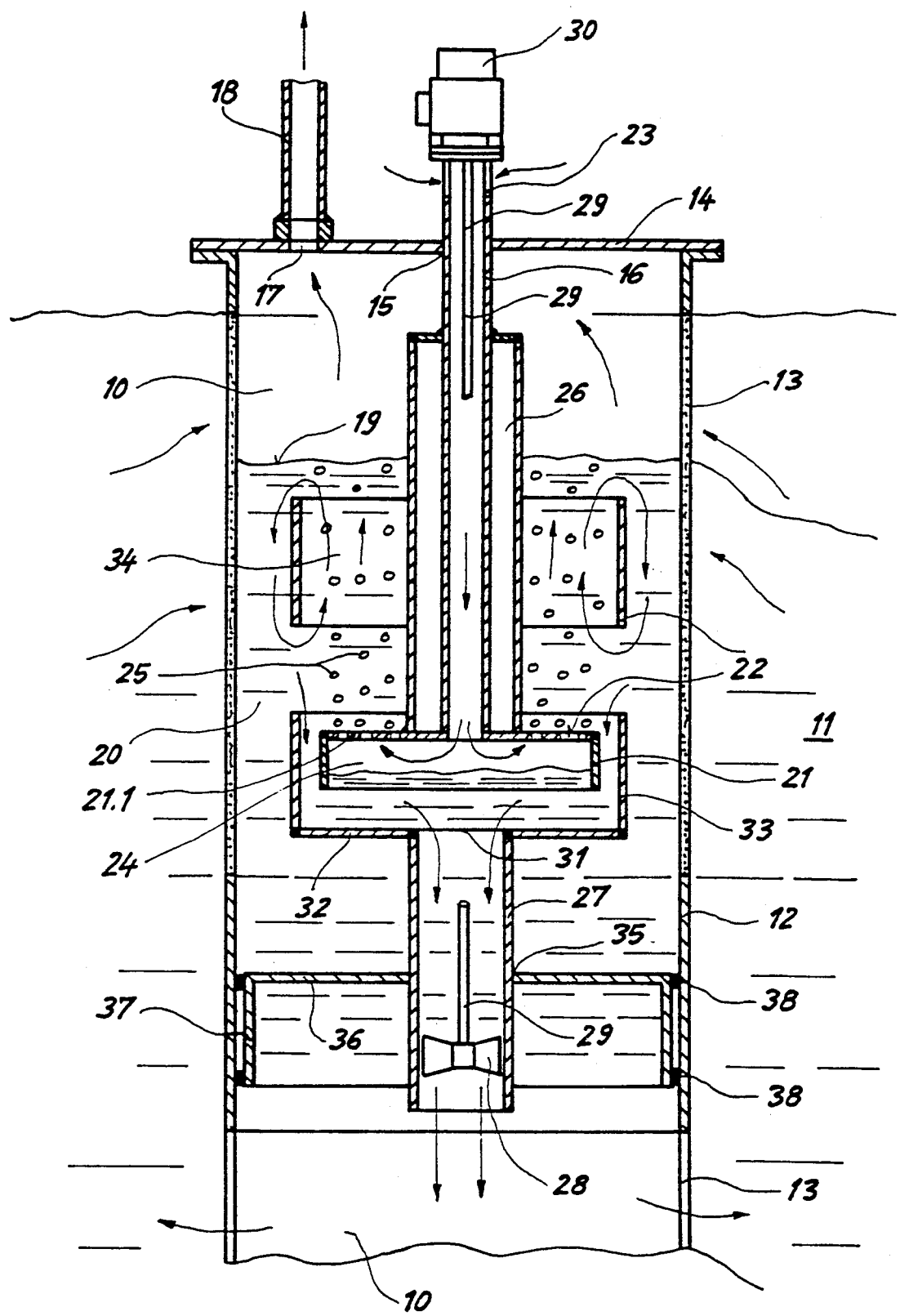

ARRANGEMENT FOR EXPELLING HIGHLY VOLATILE IMPURITIES FROM GROUND WATER

BACKGROUND OF THE INVENTION

The invention is directed to an arrangement for expelling highly volatile impurities from the ground water and the soil through which the latter flows. More particularly, it relates to an arrangement for expelling highly volatile impurities from the ground water and the soil through which the water flows by means of producing a vacuum in a well shaft which is driven into the area of the contaminated ground water and by means of directing a gas below the water level into the well shaft. Such an arrangement is already known from DE-PS No. 38 11 962. A vertical flow of ground water in the well shaft can be benefitted by means of this arrangement.

SUMMARY OF THE INVENTION

The object of the invention is to develop an arrangement of this kind in such a way that the vertical flow of ground water is more greatly benefitted and also controllable.

In keeping with these objects and with others which will become apparent hereinafter, one feature of the present invention resides, briefly stated, in an arrangement of the above mentioned type in which a nozzle body is provided for distributing the supplied gas along the well shaft cross-section via an upper defining wall of the nozzle body provided with through-openings, the nozzle body is arranged below the water level and defines an air chamber and also is held by means of a floating body, there is a pipe which is guided centrally relative to the nozzle body for guiding air and is securely connected with the nozzle body, the pipe has at least one air outlet opening in the area of the air chamber of the nozzle body, wherein in accordance with the present invention the pipe has a continuation pipe area for guiding water down and out via the nozzle body, a conveyor screw is arranged in this pipe area, and the continuation pipe is additionally provided with at least one water through-opening in the area between the nozzle body and the conveyor screw.

The driven conveyor screw located in the pipe arranged below the nozzle body in the ground water area can produce a liquid movement in the well shaft below the nozzle body and accordingly also below the cleaning area of the well shaft. This liquid flow conveys ground water either downward out of the cleaning area or upward from the bottom into the cleaning area — depending on the rotating direction of the conveyor screw — which then compulsorily triggers a countermovement of ground water either back toward the top or back toward the bottom from the upper cleaning area and accelerates the exchange of cleaned ground water and contaminated ground water in the cleaning area. This arrangement has proven particularly advantageous in cases where impurities are concentrated in deeper layers of earth through which ground water flows and where precautions must be taken against higher layers of earth being additionally contaminated subsequently when driving a well shaft. In this case, an intermediate floor can be inserted in the well shaft above the more heavily contaminated layers of earth. The continuation part of the pipe provided with the conveyor screw is guided through this intermediate floor and allows contaminated ground water to be conveyed upward from below the intermediate floor in an advisably metered manner into the cleaning area of the well shaft located above the nozzle body.

In the arrangement, according to the invention, a continuous pipe can be used which serves to guide air up into the nozzle body and to guide water below the latter and comprises corresponding openings for the passage of air and for the passage of water. But the pipe can also be divided into its air-guiding portion, its water-guiding portion and continuation portion which is provided with the conveyor screw, wherein the divided portions can also have different diameters. In both cases, the conveyor screw can be advantageously arranged on a shaft which is guided concentrically in the pipe and connected with a motor placed on the upper end of the pipe.

In order that the favorable cleaning action achieved by means of the formation of a vacuum is not endangered by turbulence when increasing the water flow in the well shaft, a guide ring can be fastened at the pipe above the nozzle body at a distance from the latter and concentric to and at a distance from the pipe. The guide ring benefits a rising of the ground water in the interior of the shaft area penetrated by air in the cleaning area and a return flow of the ground water in the outer area near the wall of the shaft. In addition, an additional guide ring can also be arranged concentric to and at a distance from the nozzle body. The additional guide ring influences the ground water flow in the area of the nozzle body. This additional guide ring can be connected at the bottom with the waterguiding continuation part of the pipe by means of a base extending at a distance from the nozzle body and can accordingly form a catch basin for the purified ground water which is to be guided down by means of the conveyor screw.

The continuation part of the pipe can serve simultaneously as a guide for an intermediate floor of the well shaft, which has already been mentioned. At least one inflatable clamping hose can be fastened in an advantageous manner at the outer pot wall of the intermediate floor insert, which is advisably constructed in a pot-shaped manner, as fastening member for anchoring the intermediate floor at the well shaft wall. In addition, the nozzle body can be penetrated by nozzle shafts which are known from DE-PS No. 38 11 962 and are provided with air inlet openings in their walls in the area of the air chamber and can exert an additional suction action on the ground water in the area of the nozzle body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a longitudinal section of an arrangement for expelling highly volatile impurities in accordance with the present invention.

DETAILED DESCRIPTION OF THE PREFERRED EMBODIMENTS

A well shaft 10 which leads into ground water and is driven e.g. through soil 11 which is contaminated by chlorinated hydrocarbons is faced partly with closed pipe portions 12 and partly with water-permeable sieve pipe portions 13. The upper end of the well shaft 10 is closed by a cover 14. A central opening 15 for the free passage of a central pipe 16 and an eccentrically positioned opening 17 for a suction pipe are formed in the cover 14. The suction pipe 18 leads to a ventilator, not shown, by means of which a vacuum is produced in the well shaft above the ground water table 19 formed in the latter.

The arrangement for expelling highly volatile contaminants from the ground water 20 collecting in the well shaft is inserted into the well shaft 10. It primarily has a nozzle body 21 whose upper defining wall 21.1 is provided with nozzle openings 22. The nozzle body 21 is fastened at the lower end of the central pipe 16 air can flow in through the central pipe 16 and particularly through upper outer openings 23 into the interior 24 of the nozzle body, air then rises up through the nozzle openings 22 through the ground water 20 in the form of fine bubbles 25 under the action of the vacuum 10 produced above the ground water level 19. An annular floating body 26 which holds the nozzle body 21 so as to float at a desired distance from the water level 19 is constructed around the central pipe 16.

The central pipe 16 continues below the nozzle body 21 in a central pipe portion or pipe member 27 which is located entirely in the ground water area. A conveyor screw 28 is arranged in this pipe member. The conveyor screw 28 is fastened on a shaft 29 which is guided through the pipe member 27, the nozzle body 21 and the pipe 16 and is driven by a drive motor 30 placed on the upper outer end of the pipe 16.

The pipe 16 and the pipe member 27 can also consist of a continuous pipe in one piece which would have to comprise air outlet openings in the area of the nozzle body 21 and ground water through-openings below the latter. In the shown embodiment example, the lower pipe portion is fastened in a central water through-opening 31 of a base wall 32 of a guide ring 33 which extends concentric to and at a distance from the nozzle body 21 and is fastened at the nozzle body 21 by means of retaining webs, not shown. Moreover, a guide ring 34 is arranged above the nozzle body 21 so as to be concentric to the pipe 26 and is fastened at the floating body 26 by means of individual spacer webs, not shown.

The pipe member 27 is guided through a central opening 35 of an intermediate floor 36 so as to be freely movable. The intermediate floor 36 is arranged in the well shaft 10. and constructed in a pot-shaped manner. Its pot wall 37, which extends parallel to the shaft walls, is provided at the outside with two inflatable clamping hoses 38. The hoses 38 are inflatable via hose lines, not shown, and fasten the intermediate floor 36 at the well shaft wall.

Flow arrows show the through-flow of air in the arrangement and in the well shaft caused by the vacuum, as well as the flowing of ground water through the sieve wall portions 13 of the well shaft and inside the well shaft under the action of a vacuum in the well shaft. The vertical flow of the ground water is increased in the well shaft by means of the conveyor screw 28. A suction of ground water from the cleaning area located above the sieve body 21 downward through the pipe portion 27 is indicated in the drawing. However, the ground water can also be conveyed from below the intermediate floor 36 upward into the cleaning area of the arrangement by reversing the direction of rotation of the conveyor screw 28. In addition, eccentric additional nozzle shafts, such as are shown and described in DE-PS No. 38 11 962, can be arranged in the nozzle body.

It will be understood that each of the elements described above, or two or more together, may also find a useful application in other types of constructions differing from the types described above.

While the invention has been illustrated and described as embodied in an arrangement for expelling highly volatile impurities from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for expelling highly volatile impurities from a ground water and a soil through which the ground water flows under the action of vacuum in a well shaft driven into an area of contaminated ground water and by directing a gas below a water level in the well shaft, the arrangement comprising a nozzle body for distributing a supplied gas along a well shaft cross-section, said nozzle body being arranged below a water level of the ground water to define an air chamber; a pipe guided centrally relative to said nozzle body for guiding the supplied gas and having at least one gas outlet opening in the vicinity of said air chamber of said nozzle body; a pipe member forming a continuation of said pipe for guiding the water down and out through said nozzle body; a conveyor screw arranged in said pipe member, said pipe member being additionally provided with at least one water through-opening in the region between said nozzle body and said conveyor screw; an intermediate floor arranged in the well shaft and being formed by a pot-like insert provided with an opening for displaceably guiding said pipe member, said pipe member extending through said opening in said intermediate floor; and means for securing said intermediate floor to the well shaft.

2. An arrangement as defined in claim 1, wherein said nozzle body has an upper wall provided with through-openings for supplying the gas therethrough.

3. An arrangement as defined in claim 1; and further comprising a floating body arranged in the wall shaft and attached to the nozzle body above the nozzle body, said floating body acting to float said nozzle body at a predetermined distance below the water level.

4. An arrangement as defined in claim 1; and further comprising means for rotating said conveyor screw and including a shaft extending through said pipe member and said pipe and a motor connected with said shaft.

5. An arrangement as defined in claim 4, wherein said pipe has an upper end, said motor being arranged on said upper end of said pipe.

6. An arrangement as defined in claim 1, wherein said fastening means include at least one inflatable clamping hose.

7. An arrangement as defined in claim 1; and further comprising a plurality of nozzle shafts extending through said nozzle body and provided with air inlet openings in the region of said air chamber.

8. An arrangement as defined in claim 1; and further comprising a guide ring arranged in a fixed relationship relative to said pipe above said nozzle body, said guide ring being spaced from the nozzle body and arranged coaxial to the pipe to reduce turbulence and promote cleaning action.

9. An arrangement as defined in claim 8; and further comprising an additional guide ring having a base, said additional guide ring being connected to said pipe member via said base, said additional guide ring extending a distance below said nozzle body and said additional guide ring being concentric to said nozzle body.

10. An arrangement as defined in claim 1; and further comprising a floating body connected to the nozzle body above the nozzle body, said floating body acting to float said nozzle body at a predetermined distance below the water level and being formed as an annular body coaxial to at least one of said pipe and said pipe member.

11. An arrangement as defined in claim 10; wherein said nozzle body is attached to said pipe so that said air chamber can receive the gas from said pipe and said floating body is attached to said pipe above said nozzle body and arranged coaxial to said pipe and said pipe member.

* * * * *